Aug. 22, 1944.　　　　J. D. UPHAM　　　　2,356,487
ISOMERIZATION OF HYDROCARBONS
Filed Aug. 10, 1942
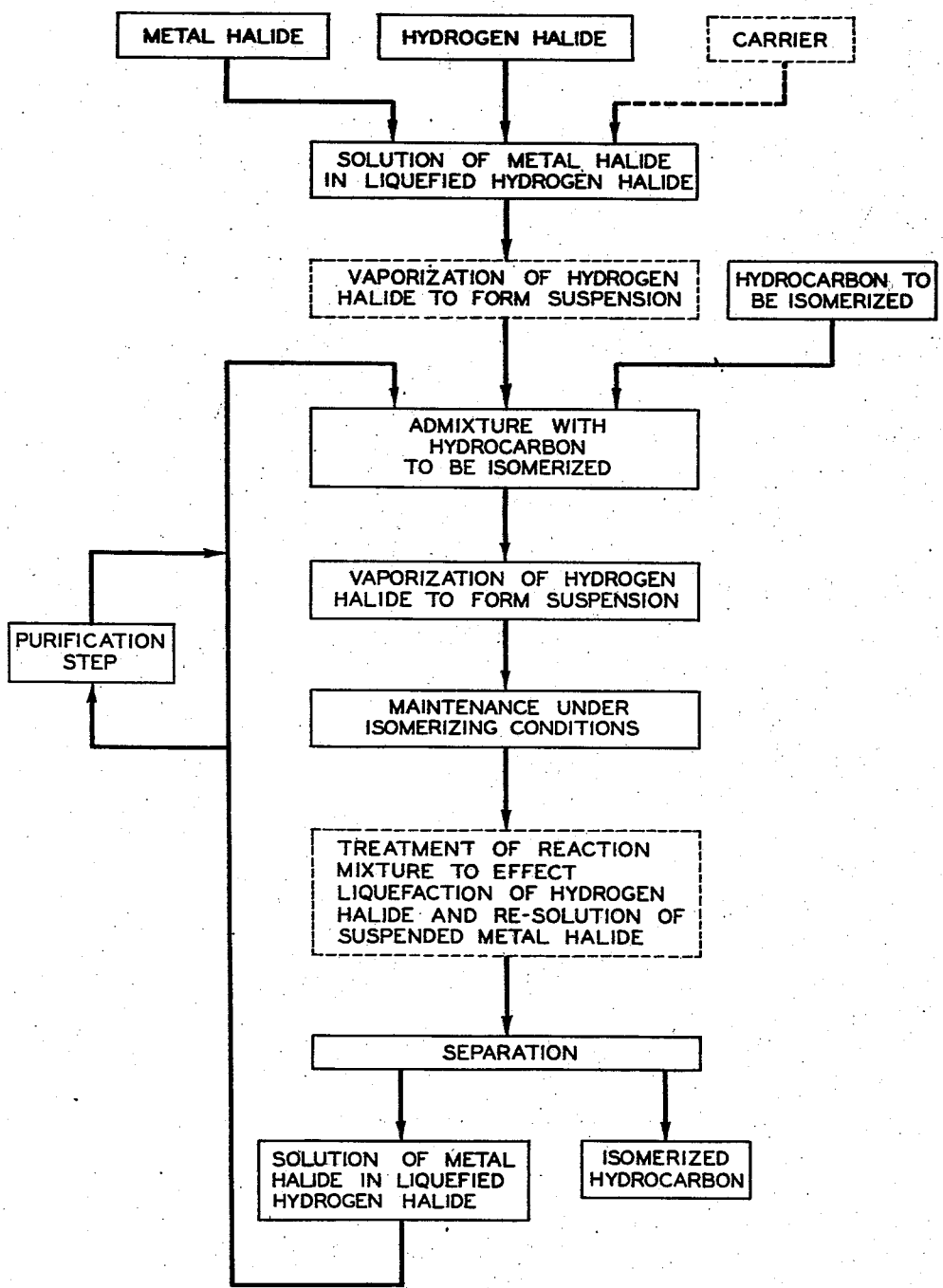
INVENTOR
J. D. UPHAM
BY
ATTORNEYS Patented Aug. 22, 1944

2,356,487

UNITED STATES PATENT OFFICE 2,356,487

ISOMERIZATION OF HYDROCARBONS

John D. Upham, Bartlesville, Okla., assignor to Phillips Petroleum Company, a corporation of Delaware Application August 10, 1942, Serial No. 454,310

15 Claims. (Cl. 260—683.5)

This invention relates to the catalytic isomerization of hydrocarbons, namely of straight-chain and less highly-branched chain paraffins to isoparaffins and of cycloparaffins to branched or alkylated cycloparaffins. Typical examples are the conversion of normal butane to isobutane and of cyclohexane to methyl cyclopentane. More particularly it relates to such a conversion accomplished by means of catalysts comprising the normally solid halides of polyvalent metals especially in the presence of hydrogen halides which act as promoter or activator for the metallic halide.

The principal object of this invention is to provide an improved process for the catalytic isomerization of paraffins and cycloparaffins. Another object is to provide such a process wherein the catalyst is presented in a novel and superior physical form. Another object is to provide an improved method of the foregoing type involving recycling of the catalyst. Still another object is to provide a process of the foregoing type wherein the metallic halide is anhydrous aluminum chloride and the hydrogen halide is anhydrous hydrogen chloride. Numerous other objects will more fully hereinafter appear.

The accompanying drawing which is self-explanatory in the light of the following description portrays diagrammatically one mode of operation in accordance with my invention. Optional steps are enclosed in dotted lines.

In accordance with my invention, an anhydrous normally solid polyvalent metal halide which is a catalyst for the isomerization of paraffins and cycloparaffins is dissolved in liquid anhydrous hydrogen halide held under pressure sufficient to maintain liquid phase at the prevailing temperature. Preferably the proportions of the metallic halide and the hydrogen halide are such that the solution formed is substantially saturated with respect to the metal halide.

The resulting solution of the metal halide in the liquefied hydrogen halide may then be contacted with a hydrocarbon fluid which may be either liquid or gaseous. For example the solution of the metal halide in the liquid hydrogen halide may be injected into the hydrocarbons to be isomerized, in the isomerization zone, either batchwise or continuously.

Almost invariably the hydrocarbon fluid contacted with the solution of the metal halide in the hydrogen halide is the hydrocarbon to be isomerized. However it may be another hydrocarbon employed as a suspension medium for the preparation of the catalyst suspension or slurry, provided this hydrocarbon medium does not interfere with the main isomerization upon addition of the suspension to the reaction zone.

During or following intermixture of solution of the metal halide in the hydrogen halide with the hydrocarbon, a sufficient portion of the hydrogen halide is volatilized from the solution in order to precipitate a corresponding portion of the metal halide in solid form. If the hydrocarbon medium is at a temperature above the boiling point of the hydrogen halide under the prevailing pressure, this causes vaporization of a portion of the hydrogen halide. Alternatively, if the pressure prevailing is sufficiently low, this in itself will effect the vaporization and consequent precipitation. Or, both higher temperature and lower pressure may effect this result.

In many cases the temperature will be deliberately raised by the application of heat in the mixing zone where the metal halide-hydrogen halide solution is admixed with the hydrocarbon in order to cause the precipitation of the metallic halide. Alternatively, or in addition the pressure in said zone may be lowered deliberately in order to effect the precipitation.

Part or all of the hydrogen halide may be gasified and thus rendered a non-solvent for the metal halide in the vaporization step just described. Usually some hydrogen halide will be left in liquefied form. Depending directly upon the proportion of the hydrogen halide so volatilized, the amount of metal halide precipitated in this step will also vary. Thus control of the extent of volatilization affords an easy control of the extent of precipitation. At least 20% and preferably at least 50% of the dissolved metal halide is precipitated in this step.

The hydrogen halide volatilized in the step just described may or may not be removed from the resulting mixture, either substantially completely or only in part. This may be accomplished in ways known to the art, for example by the use of relief valves, control of temperature, pressure, etc. Ease of removal of the hydrogen halide will also depend upon whether the hydrocarbon fluid is in liquid or gaseous form. Where this hydrocarbon is entirely or largely in gaseous form, such removal of hydrogen halide will generally not be feasible.

The vaporization step involves a flash vaporization of the hydrogen halide, the hydrogen halide volatilizing substantially immediately upon introduction of the metal halide solution. Where the hydrocarbon is a normally gaseous material like isobutane or is in vaporized state, it may be analogous to spray drying, all of the liquid phase disappearing and all the metal halide being precipitated in an extremely fine and flocculent easily suspendible form in which it is readily floated in the gaseous reaction mixture, for example in the manner of Subkow 2,231,231.

The result of the hydrogen halide vaporization step is production of a suspension or slurry of finely divided metal halide in the hydrocarbon liquid or gas and in any remaining liquid hydrogen halide.

Alternately to the vaporization step just described, or additionally thereto, a part of the liquefied hydrogen halide may be vaporized before introduction to the hydrocarbon fluids to form a suspension of solid metal halide in a solution of the balance of the metal halide in the remaining liquefied hydrogen halide. This suspension is admixed with the hydrocarbon fluid, with or without further volatilization of hydrogen halide and attendant further precipitation of additional solid metal halide. By proceeding in this manner, some excess hydrogen halide is removed, and cooling in the reaction zone due to vaporization of hydrogen halide is minimized. It will usually be desirable to stop the vaporization of hydrogen halide at a point where some hydrogen halide is still in liquid form to act as suspension medium for the precipitate. However under unusual circumstances all of the hydrogen halide may be gasified leaving a pulverulent solid metal halide. If a process like spray drying has been employed this solid metal halide will be in a form very readily adapted for catalyzing the isomerization reaction.

The vaporization step or the vaporization-admixture step may be effected by any known means for obtaining intimate and rapid intermixture and volatilization, as spray nozzles, mixing orifices, spray chambers, expansion chambers, etc.

The steps outlined up to this point provide a very effective method of producing finely divided highly active metal halide catalyst. The solid metal halide produced in this way may be either a somewhat granular or a flocculent precipitate. Its surface area is great, it is very highly extended, and it is much superior to solid metal halide which has been ground up mechanically or otherwise comminuted. It may be suspended in either gaseous or liquid hydrocarbons. Turbulent flow or other agitation may be provided for.

Following the vaporization-admixture step, or the admixture step where the hydrogen halide was volatilized prior to the admixture step, the mixture of hydrocarbon and metal halide, with at least sufficient hydrogen halide to act as promoter, is subjected to conditions such as to effect isomerization to an optimum extent. Selection of these conditions is now well within the skill of the art. Typical conditions are illustrated in Ipatieff et al. 2,169,494; Peski et al. 2,249,366; McMillan 2,274,624; McMillian et al. 2,277,022; Lee 2,278,934; Lynch 2,280,710. In general the temperature may range from 30° F. up to 300° F. or even higher up to temperautres at which cracking takes place to an objectionable extent. Either vapor or liquid phase isomerization may be carried out. The pressures may range from substantially atmospheric up to values sufficient to maintain the hydrogen halide or the hydrocarbon or both in liquid phase where desired.

Following reaction, the mixture may be treated in any suitable manner to recover the desirable components thereof. Any unconverted hydrocarbon may be separated and recycled for further treatment. Any sludge formed may be removed and discarded or treated in known ways for the recovery of metal halide catalyst contained therein which may then be used over again. The isomeric hydrocarbon which constitutes the product is readily recovered. The hydrogen halide is similarly easily recovered and recycled. Any metal halide which has not formed sludge is likewise readily recoverable from the reaction mixture and returned to the process. If desired, the recovered metal halide may be dissolved in the liquefied recovered hydrogen halide and the solution recycled.

In a particularly efficacious mode of operation the reaction mixture or effluent is cooled and/or compressed to liquefy the hydrogen halide content thereof which then re-dissolves the metal halide. The solution thus formed may be separated from the hydrocarbons and recycled, a portion or all being diverted for purification as desired.

It will be understood that the entire process may be carried out batchwise or continuously, or portions may be carried out batchwise and the remainder continuously, as found expedient.

As the metal halide I prefer to use aluminum chloride since it is cheap, readily obtained, and very effective. However I may use any of the normally solid fluorides, chlorides, bromides or iodides of aluminum, zinc, tin, antimony, zirconium, beryllium, titanium, iron, molybdenum, etc. Usually the chlorides of polyvalent metals the hydroxides of which are amphoteric are employed. These catalysts are sometimes described as of the Friedel-Crafts type.

As the hydrogen halide, I prefer to use hydrogen chloride, although I may use hydrogen fluoride, bromide or iodide. An especially preferred combination is aluminum chloride with hydrogen chloride. Both the hydrogen halide and the metal halide should be anhydrous, as well as the hydrocarbon, and water should be excluded from all materials during the carrying out of the process.

Following is a non-limiting example of one mode of practicing my invention.

Example

In a pressure tight vessel, a saturated solution of commercial anhydrous aluminum chloride in liquid anhydrous hydrogen chloride was prepared at a temperature of 18° C. by soaking an excess of solid aluminum chloride in the liquid hydrogen chloride. The liquid so prepared was drawn off into another pressure tight vessel and approximately two-thirds of the hydrogen chloride was vaporized and removed causing precipitation of an appreciable proportion of the aluminum chloride from solution. In this way a slurry of aluminum chloride was formed. A charge of anhydrous liquid normal butane (c. p.) was next introduced into a pressure vessel equipped with a stirrer and the entire contents was heated to 75° C. The slurry of aluminum chloride in the aluminum chloride-hydrogen chloride solution was forced into this vessel in quantity sufficient to give a total weight of aluminum chloride equal to ten per cent of the weight of butane. Gaseous hydrogen chloride was withdrawn from the vessel, passing first through a dephlegmator to knock back butane from the vapors. The pressure was allowed to remain at 750 lbs. per square inch gage. Under these conditions, all of the hydrogen chloride was vaporized, and the remaining dissolved aluminum chloride was precipitated in a very fine and active condition. The reaction was allowed to proceed at 75° C. for eight hours with constant stirring, after which time the contents were removed and analyzed. Thirty-three per cent of the normal butane had been converted to isobutane.

Numerous advantages of the process described herein will be apparent. Among them is the superior activity of the solid metal halide prepared thereby as compared with conventional powdered metal halide. In addition the solid metal halide precipitate is activated by hydrogen halide remaining on the surfaces thereof giving a very highly catalytically active material. Furthermore the heat of reaction may be dissipated to the desired extent by vaporization of the hydrogen halide in the reaction zone.

An especially useful modification of this invention is the incorporation of a finely divided solid adsorbent carrier material in the hydrocarbon or in the solution of metal halide in hydrogen halide. Examples of carriers are silica gel, activated alumina, adsorbent clays such as fuller's earth, activated clay, etc., adsorbent carbon such as charcoal, activated carbon, etc. In this way the catalyst as used in the reaction zone may be partly or completely impregnated onto the carrier. Such a catalyst is similar to that described in my copending application Serial No. 455,241, filed August 18, 1942.

I claim:

1. A process of catalytic isomerization of paraffinic and cycloparaffinic hydrocarbons which comprises dissolving an anhydrous normally solid polyvalent metallic halide isomerization catalyst in an anhydrous liquefied hydrogen halide, contacting the solution thus formed with the fluid hydrocarbons to be isomerized, maintaining such temperature and pressure as to cause vaporization of at least part of said hydrogen halide and thereby forming a suspension of the solid metallic halide, maintaining said suspension under isomerization conditions, and separating the hydrogen halide and metallic halide from the hydrocarbon fluids.

2. A process of effecting the catalytic isomerization of paraffinic and cycloparaffinic hydrocarbons which comprises dissolving an anhydrous normally solid polyvalent metallic halide isomerization catalyst in an anhydrous liquefied hydrogen halide, contacting the solution thus formed with fluid hydrocarbons, effecting vaporization of sufficient of said hydrogen halide to form a suspension of the solid metallic halide, and carrying out isomerization of paraffinic and cycloparaffinic hydrocarbons with the resulting suspended metallic halide.

3. The process of claim 11 wherein said metallic halide is aluminum chloride and said hydrogen halide is hydrogen chloride.

4. The process of claim 2 wherein a solid adsorbent carrier material is incorporated with the solution of said metallic halide in said liquefied hydrogen halide prior to contacting said solution with said fluid hydrocarbons.

5. The process of claim 2 wherein a solid adsorbent carrier material is incorporated with said hydrocarbons prior to contacting said solution of said metallic halide in said liquefied hydrogen halide with said hydrocarbons.

6. A process of effecting the catalytic isomerization of paraffinic and cycloparaffinic hydrocarbons which comprises dissolving an anhydrous normally solid polyvalent metallic halide isomerization catalyst in an anhydrous liquefied hydrogen halide to form a solution, vaporizing sufficient of said hydrogen halide to form a suspension of said metallic halide in a solution thereof in the remaining liquefied hydrogen halide and contacting the suspension with the fluid hydrocarbons to be isomerized, and maintaining the resulting mixture under isomerizing conditions.

7. A process of effecting the catalytic isomerization of paraffinic and cycloparaffinic hydrocarbons which comprises dissolving an anhydrous normally solid polyvalent metallic halide isomerization catalyst in an anhydrous liquefied hydrogen halide to form a solution, vaporizing sufficient of said hydrogen halide to form a suspension of said metallic halide in a solution thereof in the remaining liquefied hydrogen halide and contacting the suspension with the fluid hydrocarbons to be isomerized, effecting further vaporization of liquefied hydrogen halide to effect further precipitation and suspension of solid metallic halide, and maintaining the mixture under isomerizing conditions.

8. The process of claim 11 including the additional steps of subjecting the isomerization reaction mixture to conditions causing liquefaction of the vaporized hydrogen halide and re-solution of the suspended metallic halide, and separating the solution thus formed from the hydrocarbons.

9. The process of claim 2 including the additional steps of subjecting the isomerization reaction mixture to conditions effecting liquefaction of the vaporized hydrogen halide with consequent re-solution of the suspended metallic halide, separating the solution thus formed from the hydrocarbons, and recycling the solution so separated to said contacting step.

10. The process of claim 11 wherein said hydrocarbon is normal butane and is isomerized to isobutane.

11. A process of effecting the catalytic isomerization of paraffinic and cycloparaffinic hydrocarbons which comprises dissolving an anhydrous normally solid polyvalent metallic halide isomerization catalyst in an anhydrous liquefied hydrogen halide to form a solution, vaporizing sufficient of said hydrogen halide to precipitate at least a portion of said metallic halide as a finely divided solid and contacting fluid hydrocarbons to be isomerized with said finely divided metallic halide and with at least a portion of said hydrogen halide, and maintaining the resulting mixture under isomerizing conditions.

12. A process of effecting the catalytic isomerization of paraffinic and cycloparaffinic hydrocarbons which comprises dissolving an anhydrous normally solid polyvalent metallic halide isomerization catalyst in an anhydrous liquefied hydrogen halide to form a solution, vaporizing sufficient of said hydrogen halide to form a suspension of said metallic halide in a solution thereof in the remaining liquefied hydrogen halide, then contacting the suspension thus formed with the fluid hydrocarbons to be isomerized, and maintaining the resulting mixture under isomerizing conditions.

13. The process of claim 1 wherein said metallic halide is a chloride of a polyvalent metal the hydroxide of which is amphoteric and said hydrogen halide is hydrogen chloride.

14. The process of claim 11 wherein said metallic halide is a chloride of a polyvalent metal the hydroxide of which is amphoteric and said hydrogen halide is hydrogen chloride.

15. The process of claim 12 wherein said metallic halide is a chloride of a polyvalent metal the hydroxide of which is amphoteric and said hydrogen halide is hydrogen chloride.

JOHN D. UPHAM.